US012486389B2

(12) United States Patent
Herklots et al.

(10) Patent No.: US 12,486,389 B2
(45) Date of Patent: Dec. 2, 2025

(54) HETEROPHASIC PROPYLENE COPOLYMER COMPOSITION

(71) Applicant: SABIC GLOBAL TECHNOLOGIES B.V., Bergen Op Zoom (NL)

(72) Inventors: Marc Herklots, Geleen (NL); Jonathan Khashayar Rabiei Tabriz, Geleen (NL); Ralph Arthur Handstanger, Houthalen-Helchteren (BE); Dries Beyens, Heverlee (BE); Yang Fu, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 885 days.

(21) Appl. No.: 17/638,328

(22) PCT Filed: Aug. 14, 2020

(86) PCT No.: PCT/EP2020/072905
§ 371 (c)(1),
(2) Date: Feb. 25, 2022

(87) PCT Pub. No.: WO2021/037590
PCT Pub. Date: Mar. 4, 2021

(65) Prior Publication Data
US 2022/0306850 A1 Sep. 29, 2022

(30) Foreign Application Priority Data
Aug. 27, 2019 (EP) ..................... 19193768

(51) Int. Cl.
C08L 23/14 (2006.01)
C08L 23/0807 (2025.01)

(52) U.S. Cl.
CPC ........... C08L 23/14 (2013.01); C08L 23/0815 (2013.01)

(58) Field of Classification Search
CPC .............................. C08L 23/14; C08L 23/0815
See application file for complete search history.

(56) References Cited

U.S. PATENT DOCUMENTS

| 4,399,054 | A | 8/1983 | Ferraris et al. |
| 4,472,524 | A | 9/1984 | Albizzati |
| 4,771,024 | A | 9/1988 | Nestlerode et al. |
| 4,866,022 | A | 9/1989 | Arzoumanidis et al. |
| 5,017,714 | A | 5/1991 | Welborn, Jr. |
| 5,093,415 | A | 3/1992 | Brady, III et al. |
| 5,324,820 | A | 6/1994 | Baxter |
| 6,825,146 | B2 | 11/2004 | Kilty et al. |
| 2016/0326355 | A1* | 11/2016 | Marques Ferreira Custodio ........ C08L 23/12 |

FOREIGN PATENT DOCUMENTS

| EP | 0019330 | A1 | 11/1980 | |
| EP | 1273595 | A1 | 1/2003 | |
| EP | 1344793 | A1 | 9/2003 | |
| EP | 2145923 | A1 | 1/2010 | |
| EP | 2787034 | A1 | 10/2014 | |
| EP | 3181625 | A1 * | 6/2017 | ......... B29C 45/0001 |
| WO | 9632426 | A1 | 10/1996 | |
| WO | 03068828 | A1 | 8/2003 | |
| WO | 2006010414 | A1 | 2/2006 | |
| WO | 2007134851 | A1 | 11/2007 | |
| WO | 2014044682 | A1 | 3/2014 | |

(Continued)

OTHER PUBLICATIONS

International Search Report for International Application No. PCT/EP2020/072905, International Filing Date Aug. 14, 2020, Date of Mailing Oct. 15, 2020, 5 pages.
Ser van der Ven "Polypropylene and Other Polyolefins: Polymerization and Characterization," Studies in Polymer Science, Elsevier (1990) 11 Pages.
Written Opinion for International Application No. PCT/EP2020/072905, International Filing Date Aug. 14, 2020, Date of Mailing Oct. 15, 2020, 7 pages.

*Primary Examiner* — Catherine S Branch
*Assistant Examiner* — Andrea Wu
(74) *Attorney, Agent, or Firm* — CANTOR COLBURN LLP

(57) ABSTRACT

The invention relates to a heterophasic propylene copolymer composition comprising a heterophasic propylene copolymer (A), optionally an ethylene-unit containing polymer (B) and an inorganic filler (C), wherein the heterophasic propylene copolymer (A) consists of a) a propylene-based matrix wherein the propylene-based matrix consists of a propylene homopolymer and/or a propylene copolymer consisting of at least 90 wt % of propylene units and at most 10 wt % of comonomer units selected from ethylene monomer units and α-olefin monomer units having 4 to 10 carbon atoms wherein the propylene-based matrix is present in an amount from 87.0 to 92.0 wt % based on the heterophasic propylene copolymer and b) a dispersed ethylene α-olefin copolymer, wherein the dispersed α-olefin copolymer is present in an amount from 8.0 to 13.0 wt % based on the heterophasic propylene copolymer and wherein the sum of the weight of the propylene-based matrix and the weight of the dispersed ethylene-α-olefin copolymer is 100 wt % based on the heterophasic propylene copolymer, wherein C) the inorganic filler is present in an amount of 0.10 to 4.9 wt % based on the composition wherein the melt flow index of the composition is in the range from 5.0 to 9.0 dg/min as determined according to ISO 1133:2011 at 230° C. and 2.16 kg and wherein the total amount of ethylene units in the composition are in the range from 5.7 to 10.0 wt % based on the composition.

18 Claims, No Drawings

(56) References Cited

FOREIGN PATENT DOCUMENTS

WO      2014161621 A1    10/2014
WO      2015091983 A1     6/2015

\* cited by examiner

HETEROPHASIC PROPYLENE COPOLYMER COMPOSITION

CROSS REFERENCE TO RELATED APPLICATIONS

This application is a National Stage application of PCT/EP2020/072905, filed Aug. 14, 2020, which claims the benefit of European Application No. 19193768.9, filed Aug. 27, 2019, both of which are incorporated by reference in their entirety herein.

BACKGROUND

The invention relates to a heterophasic propylene copolymer composition and to an article, for example an infiltration box, comprising said composition.

Underground storage and transport systems, such as pipes, fittings, manholes and rain water management systems need to meet stringent requirements to ensure a long life-time, as it is undesired to replace underground systems too often.

Such systems that are installed underground (in the soil) are exposed to impact before and during installation and thus need sufficient impact resistance to prevent damage to the article during transportation, handling and installation. At the same time, such systems need to withstand the high pressure of the soil once installed and thus need sufficient stiffness and a high creep resistance and a long term stability to avoid deformation and collapse under the soil load. Moreover, it is a desire that such underground storage and transport systems are easily produced. For example, articles such as an infiltration box can easily be produced by injection moulding of a polymer composition; however this requires a good processability of such polymer composition.

Therefore, for such underground systems, it is desirable to have a polymer composition having a good impact resistance and a high stiffness, while at the same time having a flow suitable for injection molding.

Such a polymer composition is for example disclosed in WO2014/161621A1. WO2014/161621A1 discloses a heterophasic polypropylene composition comprising a propylene homo- or random copolymer matrix phase (A), and an ethylene-propylene copolymer rubber phase (B) dispersed within the matrix phase, the heterophasic polypropylene composition including a fraction soluble in p-xylene at 25° C. (XCS fraction) which is present in the resin in an amount of 4 to 14 wt.-%, and a fraction insoluble in p-xylene at 25° C. (XCU fraction) which is present in the resin in an amount of 86 to 96 wt.-%, wherein the heterophasic polypropylene composition has an MFR2, determined according to ISO 1133 at 230° C. and under a load of 2.16 kg, of 4.0 to 8.0 g/10 min; and wherein the heterophasic polypropylene composition has a flexural modulus higher than 1500 MPa measured on an injection moulded specimen with the dimension 80×10×4 mm3 according to ISO 178; and wherein the heterophasic polypropylene composition has a content of monomer units derived from ethylene of 2.0 to 7.0 wt.-%. Preferably in such composition, the amount of mineral, inorganic filler (C) is present in an amount of 5 to 55 wt % with respect to the total weight of the filled heterophasic polypropylene composition.

However, for incorporation of such high amounts of mineral, inorganic filler, a separate compounding step is required.

SUMMARY

There is a need to further improve such heterophasic propylene copolymer composition. Such heterophasic propylene copolymer composition should have a good flow, while at the same time, it should also have a good long-term stability. An increase in flow allows for a faster injection molding, thereby decreasing cycle times and increasing production rates. Therefore, it is the object of the invention to provide a heterophasic propylene copolymer composition having an improved flow while at the same time providing an excellent balance between stiffness, impact and long-term stability and which heterophasic propylene copolymer composition can easily be prepared using a continuous extrusion in-line with the preparation of the heterophasic polypropylene composition in the reactor.

This object has been achieved by a heterophasic propylene copolymer composition comprising a heterophasic propylene copolymer (A), optionally an ethylene-unit containing polymer (B) and an inorganic filler (C), wherein the heterophasic propylene copolymer (A) consists of
a) a propylene-based matrix wherein the propylene-based matrix consists of a propylene homopolymer and/or a propylene copolymer consisting of at least 90 wt % of propylene units and at most 10 wt % of comonomer units selected from ethylene monomer units and α-olefin monomer units having 4 to 10 carbon atoms wherein the propylene-based matrix is present in an amount from 87.0 to 92.0 wt % based on the heterophasic propylene copolymer and
b) a dispersed ethylene α-olefin copolymer, wherein the dispersed α-olefin copolymer is present in an amount from 8.0 to 13.0 wt % based on the heterophasic propylene copolymer and wherein the sum of the weight of the propylene-based matrix and the weight of the dispersed ethylene-α-olefin copolymer is 100 wt % based on the heterophasic propylene copolymer, wherein C) the inorganic filler is present in an amount of 0.10 to 5.0 wt % based on the composition
wherein the melt flow index of the composition is in the range from 5.0 to 9.0 dg/min as determined according to ISO 1133:2011 at 230° C. and 2.16 kg and wherein the total amount of ethylene units in the composition are in the range from 5.7 to 10.0 wt % based on the composition and
wherein the amount of CXS in the heterophasic propylene copolymer composition is in the range from 8.0 to 15 wt % based on the heterophasic propylene copolymer composition, wherein the amount of the xylene-soluble matter (CXS) is measured according to ISO 16152: 2005 in p-xylene at 25° C.

The composition of the invention surprisingly has an improved flow and shows an excellent balance between flow, stiffness, impact and long term stability. Furthermore, due to the limited amount of talc, the composition can be prepared using in-line extrusion. With in-line extrusion is meant that the extruder is directly connected to the output of the plant and can be operated at a throughput that is at least equal to the throughput of the reactor(s) with which the heterophasic propylene copolymer is prepared.

DETAILED DESCRIPTION

(A) Heterophasic Propylene Copolymer

Process for the Preparation of the Heterophasic Propylene Copolymer (A)

Heterophasic propylene copolymers are generally prepared in one or more reactors, by polymerization of propylene in the presence of a catalyst and subsequent polymerization of ethylene with α-olefins. The resulting polymeric materials are heterophasic, but the specific morphology usually depends on the preparation method and monomer ratios used.

The heterophasic propylene copolymers employed in the process according to present invention can be produced using any conventional technique known to the skilled person, for example a multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer may be prepared by a process comprising
  polymerizing propylene and optionally ethylene and/or α-olefin in the presence of a catalyst system to obtain the propylene-based matrix and
  subsequently polymerizing ethylene with α-olefins in the presence of a catalyst system in the propylene-based matrix to obtain the heterophasic propylene copolymer consisting of a propylene-based matrix and a dispersed phase. These steps are preferably performed in different reactors. The catalyst systems for the first step and for the second step may be different or same.

Catalyst System

Ziegler-Natta catalyst systems are well known in the art. The term normally refers to catalyst systems comprising a transition metal containing solid catalyst compound (procatalyst) and an organo-metal compound (co-catalyst). Optionally one or more electron donor compounds (external donor) may be added to the catalyst system as well.

The transition metal in the transition metal containing solid catalyst compound is normally chosen from groups 4-6 of the Periodic Table of the Elements (Newest IUPAC notation); more preferably, the transition metal is chosen from group 4; the greatest preference is given to titanium (Ti) as transition metal.

Although various transition metals are applicable, the following is focused on the most preferred one being titanium. It is, however, equally applicable to the situation where other transition metals than Ti are used. Titanium containing compounds useful in the present invention as transition metal compound generally are supported on hydrocarbon-insoluble, magnesium and/or an inorganic oxide, for instance silicon oxide or aluminum oxide, containing supports, generally in combination with an internal electron donor compound. The transition metal containing solid catalyst compounds may be formed for instance by reacting a titanium (IV) halide, an organic internal electron donor compound and a magnesium and/or silicon containing support. The transition metal containing solid catalyst compounds may be further treated or modified with an additional electron donor or Lewis acid species and/or may be subjected to one or more washing procedures, as is well known in the art.

Some examples of Ziegler-Natta (pro)catalysts and their preparation method which can suitably be used to prepare the heterophasic propylene copolymer (A) can be found in EP 1 273 595, EP 0 019 330, U.S. Pat. No. 5,093,415, Example 2 of U.S. Pat. Nos. 6,825,146, 4,771,024 column 10, line 61 to column 11, line 9, WO03/068828, U.S. Pat. No. 4,866,022, WO96/32426A, example I of WO 2007/134851 A1 and in WO2015/091983 all of which are hereby incorporated by reference.

The (pro)catalyst thus prepared can be used in polymerization of the heterophasic propylene copolymer using an external donor, for example as exemplified herein, and a co-catalyst, for example as exemplified herein.

In one embodiment, the heterophasic propylene copolymer is made using a catalyst which is free of phthalate.

It is preferred to use so-called phthalate free internal donors because of increasingly stricter government regulations about the maximum phthalate content of polymers. In the context of the present invention, "essentially phthalate-free" or "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst. Examples of phthalates include but are not limited to a dialkylphthalate esters in which the alkyl group contains from about two to about ten carbon atoms. Examples of phthalate esters include but are not limited to diisobutylphthalate, ethylbutylphthalate, diethylphthalate, di-n-butylphthalate, bis(2-ethylhexyl)phthalate, and diisodecylphthalate.

Examples of phthalate free internal donors include but are not limited to 1,3-diethers, for example 9,9-bis (methoxymethyl) fluorene, optionally substituted malonates, maleates, succinates, glutarates, benzoic acid esters, cyclohexene-1,2-dicarboxylates, benzoates, citraconates, aminobenzoates, silyl esters and derivatives and/or mixtures thereof.

The catalyst system comprising the Ziegler-Natta procatalyst may be activated with an activator, for example an activator chosen from the group of benzamides and monoesters, such as alkylbenzoates.

The catalyst system includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, tri-isobutylaluminum, trihexylaluminum, di-isobutylaluminum hydride, trioctylaluminium, dihexylaluminum hydride and mixtures thereof, most preferably, the cocatalyst is triethylaluminium (abbreviated as TEAL).

Examples of external donors are known to the person skilled in the art and include but are not limited to external electron donors chosen from the group of compounds having a structure according to Formula III $(R^{90})_2N\text{—}Si(OR^{91})_3$, compounds having a structure according to Formula IV: $(R^{92})Si(OR^{93})_3$ and mixtures thereof, wherein each of $R^{90}$, $R^{91}$, $R^{92}$ and $R^{93}$ groups are each independently a linear, branched or cyclic, substituted or unsubstituted alkyl having from 1 to 10 carbon atoms, preferably wherein $R^{90}$, $R^{91}$, $R^{92}$ and $R^{93}$ groups are each independently a linear unsubstituted alkyl having from 1 to 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS) or diisobutyl dimethoxysilane (DiBDMS).

Propylene-Based Matrix

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR or by determining the amounts made during the polymerization, as well known in the art.

The propylene-based matrix consists of a propylene homopolymer and/or a propylene copolymer consisting of at least 90 wt % of propylene units and at most 10 wt % of comonomer units selected from ethylene monomer units and α-olefin monomer units having 4 to 10 carbon atoms, for example consisting of at least 93 wt % of propylene monomer units and at most 7 wt % of the comonomer units, at least 95 wt % of propylene monomer units and at most 5 wt % of the comonomer units or at least 96 wt % of propylene monomer units and at most 4 wt % of the comonomer units, based on the total weight of the propylene-based matrix.

For purpose of the present invention, propylene unit refers to the moiety derived from propylene which is incorporated into the polymer chain during the polymerization; Mutatis mutandis, comonomer unit refers to the moiety derived from the respective comonomer which is incorporated into the polymer chain during the polymerization.

Preferably, the comonomer unit in the propylene copolymer of the propylene-based matrix is selected from the group of units of ethylene, 1-butene, 1-pentene, 4-methyl-1-pentene, 1-hexene, 1-heptene and 1-octene, and is preferably an ethylene unit.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene-α-olefin copolymer.

The propylene-based matrix is present in an amount of 87 to 92 wt %. Preferably, the propylene-based matrix is present in an amount of 88 to 91 wt % based on the total heterophasic propylene copolymer.

For a good stiffness, it is preferred that the propylene homopolymer or propylene-copolymer in the propylene-based matrix has an isotacticity of at least 96.5 wt % based on the propylene homopolymer or propylene-copolymer. For example, the isotacticity of the propylene homopolymer or propylene-copolymer in the propylene-based matrix is at most 99 wt %. The isotacticity is determined using $^{13}$C NMR.

The propylene-based matrix is preferably semi-crystalline, that is it is not 100% amorphous, nor is it 100% crystalline. For example, the propylene-based matrix has a crystallinity of at least 40%, for example at least 50% and/or for example at most 80%. For example, the propylene-based matrix has a crystallinity in the range from 40% to 80%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

The melt flow index (MFI) of the propylene-based matrix of the heterophasic propylene copolymer, $MFI_{PP}$ may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133-1:2011 (2.16 kg/230° C.). The $MFI_{PP}$ may for example be in the range from 0.1 to 50 dg/min, for example from 0.2 to 40 dg/min, for example 0.3 to 30 dg/min, for example 0.5 to 25 dg/min, for example from 1 to 20 dg/min, for example from 1.5 to 15 dg/min, wherein the $MFI_{pp}$ is measured according to ISO1133-1:2011 (2.16 kg/230° C.).

Dispersed Ethylene-α-Olefin Copolymer

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range from 0.05 to 2.0 microns, as may be determined by transmission electron microscopy (TEM). The amount of the dispersed ethylene-α-olefin copolymer in the heterophasic propylene copolymer may herein be sometimes referred as RC and can be determined using $^{13}$C NMR.

The dispersed ethylene-α-olefin copolymer is present in the heterophasic propylene copolymer (A) in an amount from 8.0 to 13.0 wt % based on the heterophasic propylene copolymer.

The amount of ethylene monomer units in the ethylene-α-olefin copolymer is preferably from 30 to 60 wt %, for example from 35 to 55 wt %, preferably from 40 to 60 wt %, for example from 47 to 53 wt % based on the ethylene-α-olefin copolymer. Preferably the amount of ethylene monomer units in the ethylene-α-olefin copolymer is at least 30 wt %, preferably at least 35 wt %, preferably at least 40 wt %, preferably at least 45 wt %, preferably at least 47 wt % and/or preferably at most 60 wt %, preferably at most 55 wt %, preferably at most 53 wt %, based on the ethylene-α-olefin copolymer. The amount of ethylene monomer units in the dispersed ethylene-α-olefin copolymer in the heterophasic propylene copolymer may herein be sometimes referred as RCC2.

The α-olefin units in the ethylene-α-olefin copolymer are preferably chosen from the group of units of α-olefins having 3 to 8 carbon atoms. Examples of suitable units of α-olefins having 3 to 8 carbon atoms include but are not limited to units of propylene, 1-butene, 1-pentene, 4-methyl- 1-pentene, 1-hexene, 1-heptene and 1-octene. More preferably, the α-olefin units in the ethylene-α-olefin copolymer are chosen from the group of units of α-olefins having 3 to 4 carbon atoms and any mixture thereof, more preferably the α-olefin units are propylene units, in which case the ethylene-α-olefin copolymer is ethylene-propylene copolymer.

The MFI of the dispersed ethylene α-olefin copolymer in the heterophasic propylene copolymer MFIrubber, may be for example at least 0.0010 dg/min, at least 0.010 dg/min, at least 0.050 dg/min, at least 0.10, and/or for example at most 10 dg/min, at most 7.0 dg/min, at most 5.0 dg/min at most 3.0 dg/min, at most 1.0 dg/min or at most 0.50 dg/min. The MFIrubber may be in the range for example from 0.0010 to 10 dg/min, for example from 0.010 to 7.0 dg/min, preferably from 0.050 to 5.0 dg/min, for example from 0.10 to 3.0 dg/min, for example from 0.10 to 1.0 dg/min, wherein the $MFI_{rubber}$ is calculated according to the following formula:

$$MFIrubber = 10^{\wedge}\left(\frac{\text{Log } MFIheterophasic - \text{matrix\_content} * \text{Log } MFImatrix}{\text{rubber\_content}}\right)$$

wherein

MFIheterophasic is the MFI (dg/min) of the heterophasic propylene copolymer measured according to ISO1133-1:2011 (2.16 kg/230° C.), MFImatrix is the MFI (dg/min) of the propylene-based matrix measured according to ISO1133-1:2011 (2.16 kg/230° C.), matrix content is the fraction of the propylene-based matrix in the heterophasic propylene copolymer, rubber content is the fraction of the dispersed ethylene-α-olefin copolymer in the heterophasic propylene copolymer. For the avoidance of any doubt, Log in the formula means $\log_{10}$.

Heterophasic Propylene Copolymer

In the heterophasic propylene copolymer in the composition of the invention, the sum of the weight of the propylene-based matrix and the weight of the dispersed ethylene-α-olefin copolymer is 100 wt % based on the heterophasic propylene copolymer.

The MFI of the heterophasic propylene copolymer ($MFI_{heterophasic}$) is at least 5.0 dg/min, for example at least 5.5 dg/min, for example at least 6.0 dg/min and/or for example at most 9.0 dg/min, for example at most 8.5 dg/min or for example at most 8.0 dg/min as measured according to ISO1133-1:2011 (2.16 kg/230° C.).

Preferably, the propylene-based matrix is a propylene homopolymer and the dispersed ethylene-α-olefin copolymer is an ethylene-propylene copolymer.

Preferably, the amount of heterophasic propylene copolymer (A) in the heterophasic propylene copolymer composition is at least 85 wt %, for example from 90 to 99 wt % with respect to the total heterophasic propylene composition.

Ethylene-Unit Containing Polymer (B)

The heterophasic propylene copolymer composition optionally further comprises an ethylene-unit containing polymer. Such ethylene-unit containing polymer is for example an ethylene copolymer of ethylene and an α-olefin comonomer having 3 to 10 carbon atoms and/or an ethylene homopolymer.

In case the ethylene-unit containing polymer (B) is produced using ethylene as the sole monomer, the polymer produced will be referred to herein as ethylene homopolymer.

In case the ethylene-unit containing polymer (B) is produced using ethylene and one or more α-olefin comonomers, the ethylene-unit containing polymer (B) will be referred to herein as ethylene copolymer.

The production process of ethylene homopolymers and and ethylene copolymers is summarised in "Handbook of Polyethylene" by Andrew Peacock (2000; Dekker; ISBN 0824795466), pages 43 to 66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

Ethylene Copolymer

The α-olefin comonomer used to produce the ethylene copolymer preferably has 3 to 10 carbon atoms, for example from 3 to 8 carbon atoms and is preferably an acyclic monoolefin such as 1-propene, 1-butene, 1-pentene, 1-hexene, 1-octene, or 4-methyl-1-pentene.

The ethylene copolymer is preferably selected from the group consisting of ethylene-1-butene copolymer, ethylene-1-hexene copolymer, ethylene-1-octene copolymer and mixtures thereof. Most preferably, the ethylene copolymer is an ethylene-1-octene copolymer.

For example, the amount of ethylene used to prepare the elastomer is at least 50 mol %. Preferably, the amount of ethylene used to prepare the elastomer is at least 57 mol %, for example at least 60 mol %, at least 65 mol % or at least 70 mol %. Even more preferably, the amount of ethylene used to prepare the elastomer is at least 75 mol %. The amount of ethylene used to prepare the elastomer may typically be at most 97.5 mol %, for example at most 95 mol % or at most 90 mol %.

For example, the ethylene copolymer has a density of 0.850 to 0.910 g/cm³. Preferably, the density of the ethylene copolymer is 0.850 to 0.890 g/cm³, for example 0.855 to 0.880 g/cm³ or 0.860 to 0.875 g/cm³, wherein the density of the ethylene copolymer is determined according to ISO1183-1:2012 at 23° C.

For example, the ethylene copolymer has a melt flow index of 5 to 50 dg/min measured in accordance with ASTM D1238 using a 2.16 kg weight and at a temperature of 190° C. Preferably, the melt flow index of the ethylene copolymer is for example at least 7 dg/min, at least 10 dg/min, at least 15 dg/min, at least 20 dg/min, at least 25 dg/min, at least 27 dg/min and/or for example at most 45 dg/min, at most 40 dg/min, at most 35 dg/min, at most 33 dg/min, at most 30 dg/min measured in accordance with ASTM D1238 using a 2.16 kg weight and at a temperature of 190° C.

For example, ethylene copolymers which are suitable for use in the composition of the present invention are commercially available for example under the trademark VISTAMAXX™, ENGAGE™ 8402, ENGAGE™ 8407 and SABIC® FORTIFY™ C30070D.

Ethylene copolymers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation.

This type of catalyst is also known as "metallocene" catalyst. Metallocene catalysts are for example described in U.S. Pat. Nos. 5,017,714 and 5,324,820. The elastomers may also be prepared using traditional types of heterogeneous multi-sited Ziegler-Natta catalysts.

Ethylene Homopolymer

In case the ethylene-unit containing polymer (B) is an ethylene homopolymer, the ethylene homopolymer is preferably a low density polyethylene (LDPE).

Preferably, the low density polyethylene (LDPE) has a density in the range from 915 to 932 kg/m³ as measured according to ISO1872-2:2007. More preferably, the LDPE has a density in the range from 915 to 928 kg/m³, for example in the range from 918 to 922 kg/m³ as measured according to ISO1183-1:2012 at 23° C.

Preferably, the ethylene homopolymer has a melt flow index in the range from 0.1 to 1.0 g/10 min, wherein the melt flow index of the ethylene homopolymer is determined using ISO1133:2011 (190° C./2.16 kg).

LDPE applied in the composition of the invention may be produced by use of autoclave high pressure technology or by tubular reactor technology. An example of a suitable LDPE is the commercially available SABIC® LDPE 2100N0.

Preferably, the amount of ethylene-unit containing polymer (B) is in the range from 1.0 to 5.0 wt %, for example in the range from 1.5 to 4.0 wt % based on the heterophasic propylene copolymer composition.

Inorganic Filler (C)

Examples of suitable inorganic fillers (C) include but are not limited to: talc, calcium carbonate, mica, kaolin, clay and/or barium sulphate. Preferably, the inorganic filler is talc.

The amount of inorganic filler in the heterophasic propylene copolymer composition ranges from 0.10 to 5.0 wt % based on the heterophasic propylene copolymer composition. For example, the amount of inorganic filler in the heterophasic propylene copolymer composition is at least 0.30 wt %, for example at least 0.50 wt %, for example at least 0.90 wt %, for example at least 1.20 wt %, for example at least 1.5 wt % and/or for example at most 5.0 wt %, for example at most 4.9 wt %, for example at most 4.5 wt %, for example at most 4.1 wt %, for example at most 3.5 wt %, for example at most 3.2 wt %, for example at most 2.9 wt % based on the heterophasic propylene copolymer composition. For example, the amount of inorganic filler in the heterophasic propylene copolymer composition is from 1.5 to 3.2 wt % based on the heterophasic propylene copolymer composition.

In a special embodiment, the talc may be surface modified with a polar substance, for example ethylene bis-stearamide. This may be done off-line (i.e. surface modification of the talc prior to melt-mixing the talc with the heterophasic propylene copolymer) or the surface-modified talc may be prepared in situ (i.e. by adding the polar substance together with the talc in the step combining the heterophasic propylene copolymer with the talc). Preferably, the preparation of the surface-modified talc is done in situ as it allows for an efficient and cost-effective way of combining the different components of the heterophasic propylene copolymer composition.

Accordingly, in a preferred embodiment of the invention, the talc is mixed with the heterophasic propylene copolymer (A), as a talc and a polar substance (to form the surface-modified talc).

Without wishing to be bound by theory, it is believed that by mixing the talc with a polar substance, the talc can be 'coated' in situ. Preferably, the mixing of talc is done with ethylene-ethylene-bis-stearamide (also referred to as EBS or EBA). Off-line and in situ coating of talc with ethylene bis stearamide are for example disclosed in the examples of WO2014/044682A1, hereby incorporated by reference.

Additives (D)

The composition of the invention may further comprise additives (D).

Examples of suitable additives (D) include but are not limited to UV stabilizers, hindered amine stabilizers (HALS), process stabilisers such as phosphites, (phenolic) antioxidants, acid scavengers, lubricants, processing aids and nucleating agents.

Examples of nucleating agents include but are not limited to alpha nucleating agents, for example dicarboxylate calcium salts, for example Hyperform® HPN20E as commercially available from Milliken; sodium benzoates, vinyl cycloalkane polymers, for example vinyl cyclohexane (VCH) polymer, vinyl cyclopentane polymer and vinyl-2-methyl cyclohexane polymer, but can of course also be other nucleating agents such as beta nucleating agents.

Preferably, the additives used do not contain sulfur.

Additives may for example be present in the composition of the invention in an amount from 0.10 to 1.0 wt % based on the heterophasic propylene copolymer composition.

Properties of the Heterophasic Propylene Copolymer Composition

The amount of ethylene monomer units in the heterophasic propylene copolymer composition is in the range from 5.7 to 10.0 wt % based on the composition. For example, the amount of ethylene monomer units in the heterophasic propylene copolymer composition is at least 5.8, for example at least 5.9, for example at least 6.0, for example at least 6.3, for example at least 6.5, for example at least 6.7, for example at least 6.8, for example at least 6.9 and/or for example at most 10.0 wt %, for example at most 9.8 wt %, for example at most 9.6 wt %, for example at most 9.4 wt %, for example at most 9.2 wt %, for example at most 9.0 wt %. For example, the amount of ethylene monomer units in the heterophasic propylene copolymer composition is in the range from 6.3 to 9.4 wt %, for example in the range from 6.8 to 9.0 wt % based on the composition.

The melt flow index of the heterophasic propylene copolymer composition is in the range from 5.0 to 9.0 dg/min as determined according to ISO 1133:2011 at 230° C. and 2.16 kg. Preferably, the melt flow index of the heterophasic propylene copolymer composition is at least 5.5 dg/min, and more preferably at least 6.0 dg/min, wherein the melt flow index is determined according to ISO 1133:2011 at 230° C. and 2.16 kg. A higher flow is advantageous as it enables faster injection molding, which reduces cycle times for the preparation of articles.

Preferably, the heterophasic propylene copolymer composition has an Mw/Mn in the range from 5.0 to 9.0, wherein Mw stands for the weight average molecular weight and Mn stands for the number average weight and wherein Mw and Mn are measured according to ISO16014-1(4):2003.

Preferably, the heterophasic propylene copolymer composition has an Mz/Mw in the range from 2.0 to 4.0, wherein Mz stands for the z-average molecular weight and Mw stands for the weight average molecular weight and wherein Mz and Mw are measured according to ISO16014-1(4): 2003.

The amount of the xylene-soluble matter (CXS) and xylene-insoluble matter (CXI) were measured according to ISO 16152:2005 in p-xylene at 25° C.

The amount of CXS in the heterophasic propylene copolymer composition is in the range from 8.0 to 15 wt %, more preferably in the range from 10 to 13 wt % based on the based on the heterophasic propylene copolymer composition.

The intrinsic viscosity of the CXS ($IV_{CXS}$) and the intrinsic viscosity of the CXI ($IV_{CXI}$) were determined according to ISO-1628-1 and -3 in decalin at 135° C. using the CXS, respectively CXI as separated according to ISO 16152:2005 in p-xylene at 25° C.

The intrinsic viscosity of the xylene-soluble matter ($IV_{CXS}$), wherein the intrinsic viscosity was determined according to ISO-1628-1 and -3 in decalin at 135° C. based on the CXS as determined according to ISO 16152:2005 in p-xylene at 25° C., is preferably in the range from 3.0 to 5.0 dl/g.

The intrinsic viscosity of the xylene-insoluble matter ($IV_{CXI}$), wherein the intrinsic viscosity is determined according to ISO-1628-1 and -3 in decalin at 135° C. based on the CXI as determined according to ISO 16152:2005 in p-xylene at 25° C., is preferably in the range from 1.5 to 2.0 dl/g In a preferred embodiment, the sum of the amount of heterophasic propylene copolymer (A), the amount of the ethylene-unit containing polymer (B), the inorganic filler (C) and the additives (D) is 100 wt % based on the heterophasic propylene copolymer composition.

For example, the sum of the amount of the ethylene-unit containing polymer (B), the inorganic filler (C) and the additives (D) is at most 9.0 wt %.

Preferably, the heterophasic propylene copolymer composition of the invention has an Izod impact at -20° C. of at least 3.5 kJ/m² and for example of at most 10.0 kJ/m² and/or an Izod impact at 0° C. of at least 4.5 kJ/m² and for example of at most 12 kJ/m² and/or an Izod impact at 23° C. of at least 7.0 kJ/m² and for example of at most 20 kJ/m², wherein the Izod impact is determined by measuring the Izod impact strength at -20° C., at 0° and at 23° C. according to ISO 180 4A and using as a test geometry: 65*12.7*3.2 mm, notch 45° according to ISO 37/2 with an orientation perpendicular to the injection moulding.

Preferably, the heterophasic propylene copolymer composition of the invention has a flexural modulus of at least 1700 N/mm² and for example at most 3000 N/mm², wherein the flexural modulus is determined according to ASTM D790-10 on 3.2 mm thick specimens prepared according to ISO37/2, in the parallel orientation.

Preferably, the heterophasic propylene copolymer composition of the invention has a tensile modulus of at least 1500 N/mm² and for example of at most 3000 N/mm², wherein the tensile modulus is determined according to ISO 527/1 A with samples in the parallel orientation of injection moulding and wherein the test specimens dimensions were injected on 150*10*4 mm according to ISO 527/1 A.

Preferably, the heterophasic propylene copolymer composition of the invention has a resistance to oxidative decomposition of at least 38.0 min and for example of at most 200 min, wherein the resistance to oxidative decomposition is determined by measuring isothermal oxidation induction time (OIT) at 210° C. according to ISO11357-6.

A higher oxidative decomposition means that a potentially higher long term-stability may be achieved, which may also present itself in a higher creep resistance.

Preferably, the heterophasic propylene copolymer composition of the invention has a resistance to oxidative decomposition of at least 38.0 min and for example of at most 200 min, wherein the resistance to oxidative decomposition is determined by measuring isothermal oxidation induction time (OIT) at 210° C. according to ISO11357-6.

A longer oxidative decomposition is an indication for a longer long term-stability and may for example also present itself in a higher creep resistance.

As mentioned before, the heterophasic propylene copolymer composition of the invention shows an excellent balance between flow, stiffness and long-term stability.

Preferably, the heterophasic propylene copolymer composition of the invention satisfies the following inequation:

$$(FM*OIT)^{MFI/35} > 6.80 \quad \text{(inequation 1)}$$

wherein FM stands for flexural modulus as determined according to ASTM D790-10 on a 3.2 mm thick specimen prepared according to ISO37/2, in the parallel orientation, wherein OIT stands for resistance to oxidative decomposition, which is determined by measuring isothermal oxidation induction time (OIT) at 210° C. according to ISO11357-6 and wherein MFI stands for melt flow index as determined according to ISO1133-1:2011 (2.16 kg/230° C.).

For example, the density of the heterophasic propylene copolymer composition of the invention is in the range from 900 to 940 kg/m³, more preferably in the range from 900 to 930 kg/m³, even more preferably in the range from 900 to 925 kg/m³, wherein the density is determined according to ISO1183-1:2012 at 23° C. A lower density is preferred as this will allow downgauging and will decrease transportation costs.

Preparation of the Heterophasic Propylene Copolymer Composition

The heterophasic propylene copolymer composition may be prepared by melt-mixing the heterophasic propylene copolymer (A), the ethylene-unit containing polymer (B), the inorganic filler (C) and the additives (D) by using any suitable means. Accordingly, the invention further relates to a process for the preparation of the composition according to the invention comprising melt mixing (A) and (C) and optionally (B) and/or (D).

The melt-mixing of the components may be done in any order. For example, (C) and (D) and optionally (B) may be mixed prior to melt-mixed with (A). Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that (A) is melt-mixed with other components at a temperature that exceeds the melting point of (A). Melt-mixing may be done using techniques known to the skilled person, for example in an extruder. Generally, in the process of the invention, melt-mixing is performed at a temperature in the range from 200° C. to 260° C.

Suitable conditions for melt-mixing, such as temperature, pressure, amount of shear, screw speed and screw design when an extruder is used are known to the skilled person.

Further Aspects

The composition according to the invention may then be processed by any conventional technique known in the art into an article. Suitable examples of processing techniques wherein the composition according to the invention may be used include injection moulding, compression moulding and thermoforming.

The invention further relates to an article comprising the composition according to the invention. In particular, the invention relates to an article comprising the composition according to the invention, wherein the article is made by one of the processing techniques mentioned above.

In another aspect, the invention relates to the use of the heterophasic propylene copolymer composition of the invention for the preparation of an article, for example wherein the article is an extruded or injection moulded article, for example a pipe, a fitting, a manhole, or a part of a rain water management system, such as an infiltration box.

In another aspect, the invention relates to a process for the preparation of an article, for example wherein article is an extruded or injection moulded article, for example a pipe, a fitting, a manhole, or a part of a rain water management system, such as an infiltration box, comprising the steps of
providing the heterophasic propylene copolymer composition of the invention and
injection moulded or extruding said composition to prepare the article.

In another aspect, the invention relates to an article comprising the heterophasic propylene copolymer composition of the invention, for example wherein the article is an extruded or injection moulded article, for example a pipe, a fitting, a manhole, or a part of a rain water management system, such as an infiltration box.

Preferably, the amount of the heterophasic propylene copolymer composition in the article is at least 95 wt % based on the article, for example at least 96 wt % based on the article, more preferably at least 97 wt % based on the article, most preferably, the article consists of the heterophasic propylene copolymer composition.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process. When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Measurements

The tensile modulus was determined according to ISO 527/1 A with samples in the parallel orientation of injection moulding. The test specimens dimensions were injected on 150*10*4 mm according to ISO 527/1 A.

Flexural modulus (flexural stiffness, Flexural II) was determined according to ASTM D790-10 on 3.2 mm thick specimens prepared according to ISO37/2, in the parallel orientation.

Impact strength (Izod impact) was determined by measuring the Izod impact strength at −20° C., at 0° and at 23° C. according to ISO 180 4A, Test geometry: 65*12.7*3.2 mm, notch 45° according to ISO 37/2 perpendicular orientation.

The tensile creep was determined according to ISO 899-1 at 95° C. at 2.5 MPa.

The melt flow index (MFI) was determined at 230° C. (for polypropylene) or at 190° C. (for polyethylene) and 2.16 kg according to ISO1133:2011.

The resistance to oxidative decomposition was determined by measuring isothermal oxidation induction time (OIT) at 210° C. according to ISO11357-6. The measurements were performed twice and the average of the results is reported.

The density of the heterophasic propylene copolymer compositions of E1, E2, E3, E4 and CE2 was determined according to ISO1183-1:2012 at 23° C. The density of the composition of CE1 was determined according to ASTM D1505-18.

The amount of the xylene-soluble matter (CXS) and xylene-insoluble matter (CXI) of the heterophasic propylene copolymer composition was determined according to ISO 16152:2005 in p-xylene at 25° C.

The intrinsic viscosities of the xylene soluble matter (CXS) and xylene insoluble matter (CXI) were determined according to ISO-1628-1 and −3 in decalin at 135° C.

NMR: amount of Propylene-Based Matrix and Dispersed Ethylene α-Olefin Copolymer

The amount of the propylene-based matrix, the amount of ethylene incorporated into the dispersed ethylene-α-olefin copolymer (also referred to herein as 'rubber phase') (RCC2) and the dispersed ethylene-α-olefin copolymer (RC) were determined by $^{13}$C-NMR spectroscopy. To this end, approximately 1500 mg of material was dissolved in 1,1,2,2-tetrachloroethane-d2 (TCE-d2). To ensure a homogeneous solution, the sample preparation has been conducted in a heated rotary oven. The NMR measurements were carried out in the solution-state using a Bruker 500 Advance III HD spectrometer operating at 500.16 and 125.78 MHz for $^1$H and $^{13}$C, respectively, and equipped with a 10 mm DUAL cryogenically-cooled probe head operating at 125° C. The $^{13}$C-NMR experiments were performed using standard single pulse excitation utilizing the NOE and bi-level WALTZ16 decoupling scheme (Zhou Z. et al. J. Mag. Reson 187 (2007) 225. A total of 512 transients were acquired per spectrum. The spectra were calibrated by setting the central signal of TCE's triplet at 74.2 ppm. Quantitative $^{13}$C NMR spectra were processed, integrated and relevant quantitative properties determined from the integrals using proprietary computer programs.

GPC/SEC

The number average molecular weight (Mn), the weight average molecular weight (Mw) and the Z average molecular weight (Mz) were determined using ISO16014-1(4): 2003. SEC-DV was used with universal calibration. SEC measurements were performed on PolymerChar GPC system. The samples were dissolved in 1,2,4-trichlorobenzene (TCB) stabilized with 1 g/L butylhydroxytoluene (BHT) at concentrations of 0.3-1.3 mg/mL for 4 hours at 160° C. 300 μL of polymer solution was injected and the mobile phase flow rate was 1.0 ml/min. Infrared detection IRS MCT and a differential viscometer were used. For setting up the universal calibration line polyethylene standards were used.

The MFI of the heterophasic propylene copolymer was determined at 230° C. and 2.16 kg according to ISO 1133: 2011.

The MFIrubber was calculated according to the following formula:

$$MFIrubber = 10^{\wedge}\left(\frac{\text{Log } MFIheterophasic - \text{matrix content} * \text{Log } MFImatrix}{\text{rubber content}}\right)$$

wherein
MFIheterophasic is the MFI (dg/min) of the heterophasic propylene copolymer measured according to ISO1133-1:2011 (2.16 kg/230° C.),
MFImatrix is the MFI (dg/min) of the propylene-based matrix measured according to ISO1133-1:2011 (2.16 kg/230° C.),
matrix content is the fraction of the propylene-based matrix in the heterophasic propylene copolymer,
rubber content is the fraction of the dispersed ethylene-α-olefin copolymer in the heterophasic propylene copolymer. For the avoidance of any doubt, Log in the formula means $\log_{10}$.

With fraction is meant the amount as compared to 1, so for example if the propylene-based matrix is present in an amount of 89 wt % based on the heterophasic propylene copolymer, the fraction is 0.89.

FTIR

The total content of ethylene (TC2) in the heterophasic propylene copolymer composition was determined using quantitative fourier transform infrared (FTIR) spectroscopy. The FTIR spectoscopy was performed on pressed films (preparation described below) on a Perkin Elmer Spectrum 100 FTIR scanning between 4400 and 400 cm−1 with a spectral resolution of 4 cm−1 and 16 accumulations.

For the preparation of the FTIR samples, 275 mg of sample material was pressed into a film between Teflon foils. Specac constant thickness filmmaker with an F-spacer was operated at 175° C. A 1 minute preheat time and a 1 minutes press time were used. A pressure of 2 tons was used. The film was removed from the hot press with a tweezer and allowed to cool down to room temperature. After cooling, both teflon foils were removed.

Calibration of FTIR was achieved by correlation to comonomer contents determined by quantitative nuclear magnetic resonance (NMR) spectroscopy.

The calibration procedure based on the results obtained from quantitative $^{13}$C NMR spectroscopy was undertaken in the conventional manner well documented in the literature. The amount of comonomer (N) was determined as weight percent via $N=k1(A/R)+k2$ Formula (2)

wherein A is the integral area defined of the comonomer band, R the integral area defined as the reference band and k1 and k2 linear constants obtained by calibaration. The band used for ethylene content quantification used was 750-705 cm−1. The reference band was 4095-4020 cm−1.

Isotacticity 175 mg of the polypropylene granules was dissolved in 3 ml at 130° C. in deuterated tetrachloroethylene (C2D2C14) containing 2,6-Di-tert-butyl-4-methylphenol (BHT) (5 mg BHT in 200 ml C2D2CL). The 13C NMR spectrum was recorded on a Bruker Avance 500 spectrometer equipped with a cryogenically cooled probe head operating at 125° C. The isotacticity of the mmmm pentad levels was determined from the 13C NMR spectrum in % based on the total pentad amount.

Materials Used

LDPE: SABIC® LDPE2100N0: commercially available low density polyethylene grade, having a melt flow index of 0.33 dg/min as determined at 190° C. and 2.16 kg according to ISO 1133:2011 and having a density of 921 kg/m$^3$ as determined according to ISO1183-1:2012 at 23° C.

Preparation of HECO 1 and HECO 2

Gas-phase polymerizations were performed in a set of two horizontal, cylindrical gas phase reactors in series to prepare the heterophasic propylene copolymers HECO 1 and HECO2. The homopolymer was formed in the first reactor (R1) and an ethylene-propylene copolymer rubber in the second one (R2) to prepare a heterophasic propylene copolymer. Both reactors were operated in a continuous way. The first reactor was equipped with an off-gas port for recycling reactor gas through a condenser and back through a recycle line to the nozzles in the reactor. In both reactors, a mixture of liquid propylene containing up to 30% propane was used as the quench liquid. A high activity procatalyst produced in accordance with example 1 of WO2015/091983 (hereby incorporated by reference) was introduced into the first reactor as a slurry in mineral oil. Diisopropyl-dimethoxysilane (DiPDMS) was used as external donor and triethylaluminium (TEAL) was used as co-catalyst. The external donor and co-catalyst were fed at an Al/Ti ratio of 120 and a Si/Ti ratio of 12 to the first reactor. During operation, polypropylene powder produced in the first reactor was discharged through a powder discharge system into the second reactor. The polymer bed in each reactor was agitated by paddles attached to a longitudinal shaft within the reactor. The reactor temperature and pressure are 70° C. and 2.3 MPa in the first and for the copolymer synthesis at 63° C. and 2.4 MPa in the second reactor. Hydrogen was fed independently to both reactors to control a melt flow index ratio over the homopolymer powder and copolymer powder. In this respect, RCC2 is the amount of ethylene incorporated in the rubber fraction (wt %) and RC is the amount of rubber incorporated in the impact copolymer (wt %) determined by $^{13}$C-NMR spectroscopy.

TABLE 1

Reaction conditions and properties of the heterophasic propylene copolymers.

| Value | unit | HECO 1 | HECO 2 |
|---|---|---|---|
| R1 | | | |
| T | °C. | 70 | 70 |
| P | MPa | 2.3 | 2.3 |
| H2/C3 | (mol/mol) | 0.0126 | 0.0126 |
| Al/Ti | (mol/mol) | 120 | 120 |
| Si/Ti | (mol/mol) | 12 | 12 |
| MFI$_{PP}$ | (dg/min) | 10.7 | 10.7 |
| R2 | | | |
| T | °C. | 63 | 63 |
| P | MPa | 2.4 | 2.4 |
| H2/C3 | (mol/mol) | 0.008 | 0.012 |
| C2/C3 | (mol/mol) | 0.32 | 0.41 |
| MFI$_{heterophasic}$ | (dg/min) | 6.5 | 6.5 |
| MFI$_{rubber}$ | (dg/min) | 0.12 | 0.12 |
| RC | (wt %) | 11 | 11 |
| RCC2 | (wt %) | 49 | 53 |
| TC2 | (wt %) | 5.4 | 5.4 |

Si/Ti is the ratio of the external donor (DiPDMS) to the procatalyst
Al/Si is the ratio of the co-catalyst (TEAL) to the external donor (DiPDMS)
H2/C3 is the molar ratio of hydrogen to propylene.

Additives Used

EBS: Ethylene bis stearamide
talc: Crys-talc® 7C from Imerys
antioxidant: AO: Tris(2,4-di-tert-butylphenyl)phosphite (Irgafos 168 from BASF)
phenolic antioxidant: PAO: pentaerythritol tetrakis[3-[3,5-di-tert-butyl-4-hydroxyphenyl]propionate (Iganox 1010 from BASF)
acid scavengers: CaSt: calcium stearate (Ligastar 860) from Peter Greven and ZnSt: zinc stearate (Ligastar Zn 1010) from Peter Greven
nucleating agent: NA: Hyperform® HPN20E from Milliken The compositions of examples E1-E3 were prepared extruding the HECO 1 (E1, E2, E3) in a twin screw ZE25 extruder with the EBS, talcum and LDPE and other additives (1500 ppm AO, 4000 ppm PAO, 500 ppm CaSt, 500 ppm ZnSt, 250 ppm NA) according to the formulation in Table 2.

The heterophasic propylene copolymer composition for example E4 was prepared by extruding HECO 2 in a twin screw CMP362 extruder with the EBS, talcum and LDPE and other additives (1500 ppm AO, 4000 ppm PAO, 500 ppm CaSt, 500 ppm ZnSt, 250 ppm HPN20E) to obtain the formulation in Table 2.

Prior to dosing to the hopper of the extruder, for all examples, the talcum, LDPE and other additives were mixed with the heterophasic copolymer.

TABLE 2 formulation of examples E1-E4.

| | | E1 | E2 | E3 | E4 |
|---|---|---|---|---|---|
| EBS | ppm | 0 | 0 | 500 | 313 |
| Talc | wt % | 0.5 | 0.5 | 5 | 2.5 |
| LDPE | wt % | 0 | 2.5 | 2.5 | 2.5 |

As comparative examples, the following heterophasic propylene copolymers were used:

CE1: SABIC® PP56M10 as commercially available from SABIC containing 0 wt % talcum.
CE2: BorECO™ BC212IM: a heterophasic propylene copolymer as commercially available from Borealis containing approximately 1.0 wt % talcum.

TABLE 3

Properties of heterophasic propylene copolymers in and heterophasic propylene copolymer compositions of the examples and of the comparative examples

| | | E1 | E2 | E3 | E4 | CE1 | CE2 |
|---|---|---|---|---|---|---|---|
| PE | | 0 | 2.5 | 2.5 | 2.5 | | |
| Talc | | 0.5 | 0.5 | 5 | 2.5 | 0 | |
| TC2 HECO | wt % | 6.1 | 6.1 | 6.1 | 5.8 | 7.4 | 5.2 |
| RCC2 HECO | wt % | 58 | 58 | 58 | 53 | 49 | 51 |
| RC HECO | wt % | 11 | 11 | 11 | 11 | 15 | 10 |
| TC2 composition | wt % | 6.1 | 8.9 | 8.8 | 7.5 | 7.4 | 5.2 |
| RCC2 composition | wt % | 58 | 64 | 63 | 58 | 49 | 51 |
| RC composition | wt % | 11 | 14 | 14 | 13 | 15 | 10 |
| CXS composition | wt % | 11 | 10.6 | | 12 | 14.8 | 10.6 |
| IV CXS composition | dl/g | 4.8 | 3.6 | 3.6 | 3.6 | 3.5 | 4.6 |
| IV CXI composition | dl/g | 1.9 | 1.9 | 1.9 | 1.6 | | 2.1 |
| Mn composition | kDa | 53 | 49 | 49 | 47 | | 47 |
| Mw composition | kDa | 270 | 290 | 290 | 260 | | 320 |
| Mz composition | kDa | 690 | 720 | 720 | 740 | | 960 |
| Mw/Mn composition | kDa | 5.2 | 5.9 | 5.9 | 5.6 | | 6.9 |
| Mz/Mw composition | kDa | 2.5 | 2.5 | 2.5 | 2.8 | | 3.0 |
| MFI composition | dg/min | 7.7 | 6.6 | 6.3 | 6.6 | | 4.3 |
| Izod impact −20° C. | kJ/m$^2$ | 3.9 | 4.1 | 3.7 | 3.8 | 4.7 | 3.1 |
| Izod impact 0° C. | kJ/m$^2$ | 5.0 | 5.3 | 5.2 | 4.7 | 6.4 | 3.5 |
| Izod impact 23° C. | kJ/m$^2$ | 8.7 | 9.6 | 8.1 | 8.8 | 11.2 | 6.1 |
| Flexural II | N/mm$^2$ | 1838 | 1783 | 2034 | 1862 | 1347 | 1875 |
| Tensile modulus | N/mm$^2$ | 1602 | 1566 | 1787 | 1648 | 1184 | 1663 |
| Density | kg/m$^3$ | 908 | 908 | 936 | 919 | 905 | 911 |
| OIT 210° C. | min | 47.8 | 35.8 | 49.4 | 40.1 | 35.5 | 40.8 |
| (FM * OIT)$^{MFI/35}$ | | 12.24 | 8.06 | 7.95 | 8.30 | 6.74 | 3.98 |

Results

As can be seen from the above Table, the invention provides a heterophasic propylene copolymer composition comprising a heterophasic propylene copolymer (A), optionally an ethylene-unit containing polymer (B) and an inorganic filler (C), wherein the heterophasic propylene copolymer (A) consists of a) a propylene-based matrix wherein the propylene-based matrix consists of a propylene homopolymer and/or a propylene copolymer consisting of at least 90 wt % of propylene units and at most 10 wt % of comonomer units selected from ethylene monomer units and α-olefin monomer units having 4 to 10 carbon atoms wherein the propylene-based matrix is present in an amount from 87.0 to 92.0 wt % based on the heterophasic propylene copolymer and b) a dispersed ethylene α-olefin copolymer, wherein the dispersed α-olefin copolymer is present in an amount from 8.0 to 13.0 wt % based on the heterophasic propylene copolymer and wherein the sum of the weight of the propylene-based matrix and the weight of the dispersed ethylene-α-olefin copolymer is 100 wt % based on the heterophasic propylene copolymer, wherein C) the inorganic filler is present in an amount of 0.10 to 5.0 wt % based on the composition, wherein the melt flow index of the composition is in the range from 5.0 to 9.0 dg/min as determined according to ISO 1133:2011 at 230° C. and 2.16 kg and wherein the total amount of ethylene units in the composition are in the range from 5.7 to 10.0 wt % based on the composition and wherein the amount of CXS in the heterophasic propylene copolymer composition is in the range from 8.0 to 15 wt % based on the heterophasic propylene copolymer composition, wherein the amount of the xylene-soluble matter (CXS) is measured according to ISO 16152: 2005 in p-xylene at 25° C., which heterophasic propylene copolymer composition shows an improved flow and an excellent balance between flow, stiffness, impact and long term stability. In addition, due to the limited amount of talc needed, the composition can easily be prepared using in-line extrusion.

Preferably, a composition having a density in the range from 900 to 925 kg/m³ is used having a lower density, as this will allow downgauging an decrease transportation costs.

The invention claimed is:

1. Heterophasic propylene copolymer composition comprising a heterophasic propylene copolymer (A), optionally an ethylene-unit containing polymer (B) and an inorganic filler (C),
   wherein the heterophasic propylene copolymer (A) consists of
   a) a propylene-based matrix wherein the propylene-based matrix consists of a propylene homopolymer and/or a propylene copolymer consisting of at least 90 wt % of propylene units and at most 10 wt % of comonomer units selected from ethylene monomer units and α-olefin monomer units having 4 to 10 carbon atoms, wherein the propylene-based matrix is present in an amount from 87.0 to 92.0 wt % based on the heterophasic propylene copolymer and
   b) a dispersed ethylene α-olefin copolymer, wherein the dispersed α-olefin copolymer is present in an amount from 8.0 to 13.0 wt % based on the heterophasic propylene copolymer and wherein the sum of the weight of the propylene-based matrix and the weight of the dispersed ethylene-α-olefin copolymer is 100 wt % based on the heterophasic propylene copolymer,
   wherein C) the inorganic filler is present in an amount of 0.10 to 4.9 wt % based on the composition
   wherein the melt flow index of the composition is in the range from 5.0 to 9.0 dg/min as determined according to ISO 1133:2011 at 230° C. and 2.16 kg and
   wherein the total amount of ethylene units in the composition are in the range from 5.7 to 10.0 wt % based on the composition and
   wherein the amount of CXS in the heterophasic propylene copolymer composition is in the range from 8.0 to 15 wt % based on the heterophasic propylene copolymer composition, wherein the amount of the xylene-soluble matter (CXS) is measured according to ISO 16152: 2005 in p-xylene at 25° C.

2. The heterophasic propylene copolymer composition according to claim 1, wherein the comonomer unit in the propylene copolymer of the propylene-based matrix is selected from the group of units of ethylene, 1-butene, 1-pentene, 4-methyl-1-pentene, 1-hexene, 1-heptene and 1-octene.

3. The heterophasic propylene copolymer composition according to claim 1,
   wherein the amount of ethylene monomer units in the dispersed ethylene-α-olefin copolymer is from 40 to 60 wt % based on the ethylene-α-olefin copolymer and/or
   wherein the α-olefin units in the dispersed ethylene-α-olefin copolymer are chosen from the group of units of α-olefins having 3 to 8 carbon atoms, and/or
   wherein the melt flow index of the dispersed ethylene α-olefin copolymer (MFIrubber) is in the range for example from 0.050 to 5.0 dg/min.

4. The heterophasic propylene copolymer composition according to claim 1, wherein the amount of heterophasic propylene copolymer (A) in the heterophasic propylene copolymer composition is at least 85 wt % with respect to the total heterophasic propylene composition.

5. The heterophasic propylene copolymer composition according to claim 1, wherein the heterophasic propylene copolymer composition has an Mw/Mn in the range from 5.0 to 9.0, wherein Mw stands for the weight average molecular weight and Mn stands for the number average weight and wherein Mw and Mn are measured according to ISO16014-1(4):2003 and/or wherein the heterophasic propylene copolymer composition has a density in the range from 900 to 925 kg/m³, wherein the density is determined according to ISO1183-1:2012 at 23° C.

6. The heterophasic propylene copolymer composition according to claim 1, wherein the heterophasic propylene copolymer comprises the ethylene-unit containing polymer (B) and the ethylene-unit containing polymer (B) is an ethylene homopolymer and/or an ethylene copolymer of ethylene and an α-olefin comonomer having 3 to 10 carbon atoms.

7. The heterophasic propylene copolymer composition according to claim 1, wherein the heterophasic propylene copolymer composition satisfies the following inequation:

$$(FM*OIT)^{MFI/35} > 6.80 \qquad \text{(inequation 1)}$$

wherein FM stands for flexural modulus as determined according to ASTM D790-10 on a 3.2 mm thick specimen prepared according to ISO37/2, in the parallel orientation, wherein OIT stands for resistance to oxidative decomposition, which is determined by measuring isothermal oxidation induction time (OIT) at 210° C. according to ISO11357-6 and wherein MFI stands for melt flow index as determined according to ISO1133-1:2011 (2.16 kg/230° C.).

8. The heterophasic propylene copolymer composition according to claim 1, wherein the heterophasic propylene copolymer comprises the ethylene-unit containing polymer (B) and the ethylene-unit containing polymer (B) is an ethylene-1-octene copolymer.

9. The heterophasic propylene copolymer composition according to claim 1, wherein the heterophasic propylene copolymer comprises the ethylene-unit containing polymer (B) and the ethylene-unit containing polymer (B) is a low density polyethylene (LDPE) having a density in the range from 915 to 932 kg/m$^3$ as measured according to ISO1183-1:2012 at 23° C.

10. The heterophasic propylene copolymer composition according to claim 1, wherein the heterophasic propylene copolymer comprises the ethylene-unit containing polymer (B) and the amount of ethylene-unit containing polymer (B) is in the range from 1.0 to 5.0 wt % based on the heterophasic propylene copolymer composition.

11. The heterophasic propylene copolymer composition according to claim 1, wherein the inorganic filler (C) is talc.

12. The heterophasic propylene copolymer composition according to claim 1, wherein the composition further comprises additives (D), and optionally the additives (D) comprise one or more additives chosen from the group of UV stabilizers, hindered amine stabilizers (HALS), process stabilisers, antioxidants, acid scavengers, lubricants, processing aids and nucleating agents.

13. The heterophasic propylene copolymer composition according to claim 1,
wherein the amount of ethylene monomer units in the heterophasic propylene copolymer composition is in the range from 6.3 to 9.4 wt % and/or
wherein the melt flow index of the heterophasic propylene copolymer composition is at least 5.5 dg/min and/or
wherein the amount of CXS in the heterophasic propylene copolymer composition is in the range from 10 to 13 wt % based on the heterophasic propylene copolymer composition wherein the amount of the xylene-soluble matter (CXS) is measured according to ISO 16152:2005 in p-xylene at 25° C. and/or
wherein the intrinsic viscosity of the xylene-insoluble matter (IV$_{CXI}$) is in the range from 1.5 to 2.0 dl/g, wherein the intrinsic viscosity is determined according to ISO-1628-1 and -3 in decalin at 135° C. based on the CXI as determined on the heterophasic propylene copolymer composition according to ISO 16152:2005 in p-xylene at 25° C.

14. The heterophasic propylene copolymer composition according to claim 12, wherein the sum of the amount of heterophasic propylene copolymer (A), the amount of the ethylene-unit containing polymer (B), the inorganic filler (C) and the additives (D) is 100 wt % based on the heterophasic propylene copolymer composition.

15. Article comprising the heterophasic propylene copolymer composition of claim 1.

16. The heterophasic propylene copolymer composition according to claim 1, wherein the heterophasic propylene copolymer composition has an Mz/Mw in the range from 2.0 to 4.0 and Mz and Mw are measured according to ISO16014-1 (4):2003.

17. The heterophasic propylene copolymer composition according to claim 1, wherein C) the inorganic filler is present in an amount of 0.1 to 4.5 wt % based on the composition.

18. The heterophasic propylene copolymer composition according to claim 1, wherein C) the inorganic filler is present in an amount of 1.5 to 3.2 wt % based on the composition.

* * * * *